(12) United States Patent
Almanza Ahumada et al.

(10) Patent No.: US 11,222,311 B2
(45) Date of Patent: Jan. 11, 2022

(54) SYSTEM AND METHOD FOR SECURE DATA TRANSFER

(71) Applicant: The Toronto-Dominion Bank, Toronto (CA)

(72) Inventors: Jonathan David Almanza Ahumada, Toronto (CA); Laird Jerome Hercules, Barrie (CA); Ashkan Alavi-Harati, Richmond Hill (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 233 days.

(21) Appl. No.: 16/223,863

(22) Filed: Dec. 18, 2018

(65) Prior Publication Data

US 2020/0193390 A1 Jun. 18, 2020

(51) Int. Cl.
*G06Q 10/10* (2012.01)
*G06Q 10/02* (2012.01)
*G06Q 20/10* (2012.01)
*G06Q 20/38* (2012.01)
*G06Q 30/02* (2012.01)
*H04L 12/58* (2006.01)

(52) U.S. Cl.
CPC ........ *G06Q 10/1095* (2013.01); *G06Q 10/02* (2013.01); *G06Q 20/102* (2013.01); *G06Q 30/02* (2013.01); *H04L 51/046* (2013.01); *G06Q 20/382* (2013.01)

(58) Field of Classification Search
None
See application file for complete search history.

(56) References Cited

U.S. PATENT DOCUMENTS

| 7,930,246 | B2 * | 4/2011 | Hansen | G06Q 40/00 705/39 |
| 8,381,969 | B1 | 2/2013 | Miller et al. | |
| 8,447,700 | B2 * | 5/2013 | Yuen | G06Q 20/02 705/75 |
| 8,943,044 | B1 * | 1/2015 | Saylor | G06Q 50/01 707/722 |
| 9,262,754 | B1 * | 2/2016 | Jawharkar | G06Q 30/02 |

(Continued)

OTHER PUBLICATIONS

Chan: "Socially Connecting and Socially Distancing Consumer Choices", University of Pennsylvania Scholarly Commons, Publicly Accessible Penn Dissertations, dated Jan. 1, 2014.

*Primary Examiner* — Sujay Koneru
(74) *Attorney, Agent, or Firm* — Rowand LLP (57) ABSTRACT

In an aspect, a method includes: providing, to a first client device, an invitation configuration interface for display on the first client device, the invitation configuration interface including a selectable option to specify a date associated with an invitation for a milestone event, a selectable option to configure a value storage account, and a selectable option to define a recipient associated with the invitation; receiving, through the invitation configuration interface, a configuration parameter for the value storage account and a messaging address for the recipient; and providing an electronic invitation to the recipient by sending a message to a recipient device using the messaging address, the electronic invitation including a selectable option to send an electronic response to the invitation and a selectable option to transfer value to the value storage account.

18 Claims, 6 Drawing Sheets

(56) References Cited

U.S. PATENT DOCUMENTS

| | | | |
|---|---|---|---|
| 2004/0078283 A1* | 4/2004 | Gary | G06Q 40/12 705/14.35 |
| 2006/0136595 A1* | 6/2006 | Satyavolu | G06F 21/41 709/229 |
| 2007/0011104 A1* | 1/2007 | Leger | G06Q 20/085 705/77 |
| 2008/0201196 A1* | 8/2008 | Rowland | G06Q 10/109 705/7.13 |
| 2009/0327121 A1* | 12/2009 | Carroll | G06Q 30/02 705/39 |
| 2011/0173031 A1* | 7/2011 | Smith | G06Q 40/12 705/5 |
| 2011/0251924 A1 | 10/2011 | Savilia et al. | |
| 2011/0279851 A1* | 11/2011 | Berger | H04L 51/00 358/1.15 |
| 2012/0214416 A1* | 8/2012 | Kent | H04W 12/50 455/41.2 |
| 2013/0073475 A1* | 3/2013 | Kinkaid | G06Q 10/10 705/319 |
| 2013/0268377 A1 | 10/2013 | Jessup et al. | |
| 2014/0074701 A1 | 3/2014 | Kingston et al. | |
| 2014/0258055 A1* | 9/2014 | Wolfe | G06Q 40/02 705/30 |
| 2014/0310172 A1 | 10/2014 | Grossman et al. | |
| 2015/0106225 A1* | 4/2015 | Glass | G06Q 30/0641 705/26.7 |
| 2015/0227879 A1* | 8/2015 | Bertanzetti | G06Q 10/063112 705/7.14 |
| 2015/0262277 A1* | 9/2015 | Gassman | G06Q 30/0621 705/26.5 |
| 2015/0332375 A1* | 11/2015 | Ma | G06Q 30/0633 705/26.8 |
| 2015/0379513 A1* | 12/2015 | Taveau | H04W 12/08 705/44 |
| 2016/0086249 A1* | 3/2016 | Zamer | G06Q 30/0639 705/26.7 |
| 2016/0162882 A1* | 6/2016 | McClung, III | G06Q 20/3227 705/41 |
| 2017/0193501 A1* | 7/2017 | Cole | G06Q 20/357 |
| 2017/0221050 A1* | 8/2017 | Jivraj | G06Q 20/3674 |
| 2018/0211288 A1* | 7/2018 | Sawdy | G06Q 10/02 |
| 2019/0220839 A1* | 7/2019 | Oliynyk | G06Q 20/4014 |
| 2019/0347741 A1* | 11/2019 | Harkreader | G06Q 50/01 |
| 2020/0193390 A1* | 6/2020 | Almanza Ahumada | G06Q 10/1095 |

* cited by examiner

SYSTEM AND METHOD FOR SECURE DATA TRANSFER

TECHNICAL FIELD

The present disclosure relates to electronic data transfers and, more particularly, to systems and methods for securely transferring data between database records.

BACKGROUND

Traditional gift giving for a milestone event, such as a wedding, has numerous drawbacks. For example, wedding attendees often include cash together with a card and place the card and cash in a designated box. This can create security concerns, such as a risk of theft. Parties that cannot attend the event sometimes send such cards in the mail which further causes a risk of loss.

The volume of gifts at large events may also make it difficult for recipients to remember the gift that each invitee gave and processing such gifts (e.g., depositing a cash gift and/or writing thank you cards) may be difficult and time consuming.

It is not only the recipients who are inconvenienced or frustrated by conventional gift giving norms. Indeed, those giving a gift may find it difficult to determine a quantum for the gift. The card, which often simply acts as a container for a gift of cash, can be expensive and also contributes to environmental waste.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In an aspect, the present application describes techniques for transferring data which utilize computing systems to provide for the secure transfer of data between parties. For example, a server may provide an invitation configuration interface which allows an electronic invitation to be configured. Together with the configuration of the electronic invitation, a selectable option to configure a data storage account (which may be referred to herein as a value storage account) for an honored party (such as a bride or groom) is provided by the server. That is, when the electronic invitation is configured, a value storage account, such as a bank account, associated with the honored party may also be defined. Then, when the electronic invitation is accessed by a recipient, it may include a selectable option to transfer value to the value storage account that was configured for the honored party. Conveniently, when this option is selected, a secure transfer of value may be made. For example, since the value storage account was configured when the electronic invitation is configured, a transfer of value may be made directly to the value storage account and the possibility of theft or loss may be greatly reduced.

In at least some embodiments, prior to allowing a recipient of a gift to receive a transfer of value into an account, authentication may be performed to ensure that the value storage account is associated with a party identified on the invitation. For example, the name of a person on the invitation may be compared with the name associated with the value storage account to ensure that the names correspond to one another. Such authentication may, for example, reduce the possibility of an attack in which a malicious party sends a fraudulent invitation that has been configured with the value storage account for the malicious party but that purports to be for an event honoring another.

In at least some embodiments, the present application describes techniques for automatically determining a quantum of value to be transferred. For example, since the system may send electronic invitations to numerous recipients and numerous recipients may transfer value using the system, the system may use historical information to determine and suggest a quantum of value to be transferred by a recipient. Conveniently, the historical information that is used to determine the quantum may be historical information that is filtered based on a geographic region associated with the milestone event, based on an event type of the milestone event and/or based on a relationship type between an honored party for the milestone event and the recipient of the electronic invitation. The system may also determine the quantum of value based on the number of guests associated with an instance of the electronic invitation. For example, a greater value may be suggested when two guests are invited and/or attending than when only one is invited and/or attending.

In at least some embodiments, the present application describes techniques for automatically preparing an electronic courtesy card. Conveniently, an electronic card, which may function as an electronic thank you card, may be automatically customized based on a transfer of value. For example, when a transfer of value is made by a recipient of an electronic invitation through activation of a selectable option associated with the invitation to transfer value, then the electronic thank you card may be automatically populated with text that is based on the transfer of value.

According to the subject matter of the present application, there may be provided a server. The server may include a communications module, a processor coupled to the communications module and a memory coupled to the processor. The memory may store instructions which, when executed, configure the processor to: provide, via the communications module and to a first client device, an invitation configuration interface for display on the first client device, the invitation configuration interface including a selectable option to specify a date associated with an invitation for a milestone event, a selectable option to configure a value storage account, and a selectable option to define a recipient associated with the invitation; receive, through the invitation configuration interface and via the communications module, one or more signals representing at least the date associated with the invitation, a configuration parameter for the value storage account and a messaging address for the recipient; and provide an electronic invitation to the recipient by sending a message to a recipient device via the communications module using the messaging address, the electronic invitation including a selectable option to send an electronic response to the invitation and a selectable option to transfer value to the value storage account, the selectable option to transfer value to the value storage account configured for initiating a transfer using the configuration parameter for the value storage account.

In at least some implementations, the selectable option to transfer value to the value storage account may be further configured for automatically configuring a date associated with the transfer with the date associated with the milestone event.

In at least some implementations, the selectable option to transfer value to the value storage account may be configured to cause the recipient device to, in response to receiving a selection of the selectable option to transfer value, activate a value transfer application stored on the recipient device and provide the configuration parameter for the value storage account to the value transfer application.

In at least some implementations, the instructions may further configure the processor to: after a transfer of value has been configured through selection of the selectable option to transfer value to the value storage account, determine that a current date matches the date of the milestone event; and in response to determining that the current date matches the date of the milestone event, automatically send a message to a messaging address previously configured for a party associated with the milestone event, the message notifying the party of the transfer of value.

In at least some implementations, the selectable option to transfer value to the value storage account, when selected, may cause a selectable option to select a visual element to be provided by the server. The instructions may further configure the processor to receive a signal representing a selection of a visual element, and wherein the message includes a selected visual element.

In at least some implementations, the milestone event may include a wedding.

In at least some implementations, the instructions further configure the processor to: after determining that the selectable option to transfer value to the value storage account has been selected, send an electronic card configuration interface to the recipient device, the electronic card configuration interface allowing for configuration of an electronic card to be sent to a party associated with the milestone event.

In at least some implementations, the instructions may further configure the processor to: send via the communications module and to a messaging address previously configured for the party associated with the milestone event, a message configured for accessing the electronic card; detect that the electronic card has been accessed; and in response to detecting that the electronic card has been accessed, initiate a transfer of value.

In at least some implementations, the instructions may further configure the processor to: determine that a current date matches the date of the milestone event; and in response to determining that the current date matches the date of the milestone event, automatically send a message to a messaging address previously configured for the party associated with the milestone event, the message configured for accessing the electronic card.

In at least some implementations, the instructions may further configure the processor to: determine a suggested quantum of value to be transferred based on historical data for previously configured transfers of value; and after selection of the selectable option to transfer value to the value storage account, causing the recipient device to display the suggested quantum of value to be transferred.

In at least some implementations, the suggested quantum of value to be transferred may be determined based on a geographic region associated with the milestone event.

In at least some implementations, the suggested quantum of value to be transferred may be determined based on historical data for other recipients of invitations to the milestone event.

In at least some implementations, the suggested quantum of value to be transferred may be determined based on historical data for other recipients of invitations to other events of a same type as the milestone event.

In at least some implementations, the instructions may further configure the processor to: receive, the communication module, an indication of an event type associated with the milestone event. The suggested quantum of value to be transferred may be determined based on historical data for events having an event type corresponding to the event type specified in the received indication.

In at least some implementations, the invitation configuration interface may include a selectable option to configure a number of guests associated with the invitation and wherein the instructions further cause the processor to: receive, through the invitation configuration interface and via the communications module, an indication of the number of guests associated with the invitation. The suggested quantum of value to be transferred may be determined based on the indication of the number of guests associated with the invitation.

According to a further aspect, there is provided a computer-implemented method. The method includes: providing, to a first client device, an invitation configuration interface for display on the first client device, the invitation configuration interface including a selectable option to specify a date associated with an invitation for a milestone event, a selectable option to configure a value storage account, and a selectable option to define a recipient associated with the invitation; receiving, through the invitation configuration interface, a configuration parameter for the value storage account and a messaging address for the recipient; and providing an electronic invitation to the recipient by sending a message to a recipient device using the messaging address, the electronic invitation including a selectable option to send an electronic response to the invitation and a selectable option to transfer value to the value storage account, the selectable option to transfer value to the value storage account configured for initiating a transfer using the configuration parameter for the value storage account.

In at least some implementations, the selectable option to transfer value to the value storage account may be further configured for automatically configuring a date associated with the transfer with the date associated with the event.

In at least some implementations, the selectable option to transfer value to the value storage account may be configured to cause the recipient device to, in response to receiving the selection of the selectable option to transfer value, activate a value transfer application stored on the recipient device and provide the configuration parameter for the value storage account to the value transfer application.

In at least some implementations, the method may include: after a transfer of value has been configured through selection of the selectable option to transfer value to the value storage account, determining that a current date matches the date of the milestone event; and, in response to determining that the current date matches the date of the milestone event, automatically sending a message to a messaging address previously configured for a party associated with the milestone event, the message notifying the party of the transfer of value.

In at least some implementations, the selectable option to transfer value to the value storage account, when selected, may cause a selectable option to select a visual element to be provided. The method further include receiving a representing a selection of a visual element, and wherein the message includes the selected visual element.

In a further aspect, there is provided a non-transitory computer readable storage medium including computer-executable instructions which, when executed, configure a computing device to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
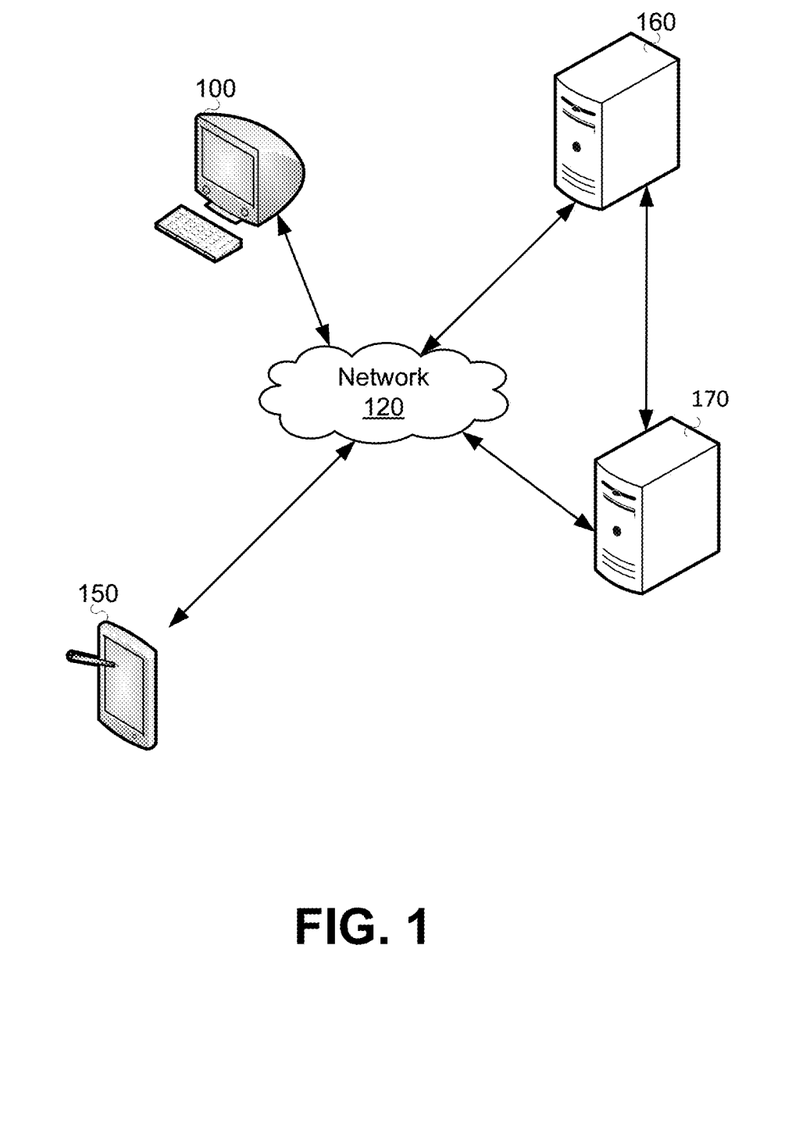
FIG. 1 is a schematic operation diagram illustrating an operating environment of an example embodiment.

FIG. 1 is a schematic operation diagram illustrating an operating environment of an example embodiment.

As illustrated, a server 160 and remote computing devices 100, 150 communicate via a network 120. A first remote computing device 100, which may be referred to as a host computing device, a first client device, or a host device, may be associated with a host. The host may be a party hosting or planning a milestone event such as a wedding and/or may be an honored guest associated with the milestone event. A second remote computing device 150, which may be referred to as a recipient computing device or a recipient device, may be associated with a recipient of an electronic invitation to the milestone event.

The server 160 may be configured to provide electronic invitation, electronic gifting and/or other functions such as those that may be described herein.

In at least some embodiments, one or more value storage management servers 170 may also be connected to one or more of the server 160, the first computing device 100 and/or the second computing device 150 through the network 120. The value storage management server 170 may maintain value storage accounts for a plurality of users. In at least some embodiments, the value storage management server 170 is a financial institution server which may maintain customer bank accounts. That is, the value storage management server 170 may maintain a database that includes various records. A database record may, for example, reflect a quantum of value stored in a particular account.

While FIG. 1 illustrates a single value storage management server 170, in practice, more than one such server may be engaged. For example, an honored guest of a milestone event may have a value storage account at one value storage management server 170 and a party that is invited to the milestone event may have a value storage account at another value storage management server 170 (e.g., at a different financial institution).

Further, while FIG. 1 depicts the server 160 that provides electronic invitation and/or gifting functions separately from the value storage management server 170, the functions of the server 160 may instead be provided on a value storage management server 170.

The remote computing devices 100, 150 and the servers 160, 170 may be in geographically disparate locations. Put differently, the remote computing devices 100, 150 may be remote from the servers 160, 170.

The remote computing devices 100, 150 and the servers 160, 170 are computer systems. The remote computing devices 100, 150 may take a variety of forms including, for example, a mobile communication device such as a smartphone, a tablet computer, a wearable computer such as a head-mounted display or smartwatch, a laptop or desktop computer, or a computing device of another type.

The remote computing devices 100, 150 are adapted to present graphical user interfaces as described herein. For example, a host device may be adapted to present an invitation configuration interface to allow for configuration of an electronic invitation to a milestone event and/or an electronic card configuration interface. By way of further example, a recipient device may be adapted to display an electronic invitation to a user and/or to display an electronic card configuration interface.

As further described below, the server 160 is adapted to provide, for display on the remote computing device, one or more graphical user interfaces that enable users of the remote computing devices to interact with the server 160. The server 160 may, in at least some embodiments, communicate with one or more value storage management servers 170.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
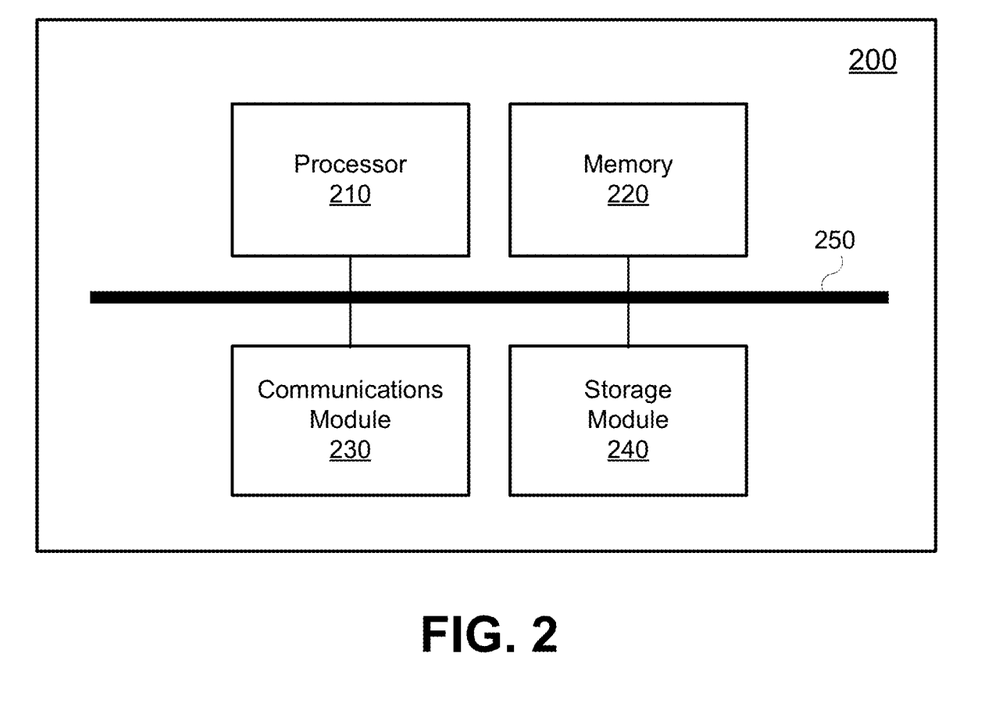
FIG. 2 is high-level schematic diagram of an example computing device.

The server 160, value storage management servers 170 and remote computing devices 100, 150 are computing devices. Referring now to FIG. 2, a high-level operation diagram of an example computing device 200 will now be described. The example computing device 200 may be exemplary of the first remote computing device 100, the second remote computing device 150, the server 160 and/or the value storage management servers 170.

The example computing device 200 includes a variety of modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

The computing device 200 will include other components apart from those illustrated in FIG. 2 and the specific component set may differ based on whether the computing device 200 is operating as the first remote computing device 100, second remote computing device 150, server 160 or value storage management server 170. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Figure 3:
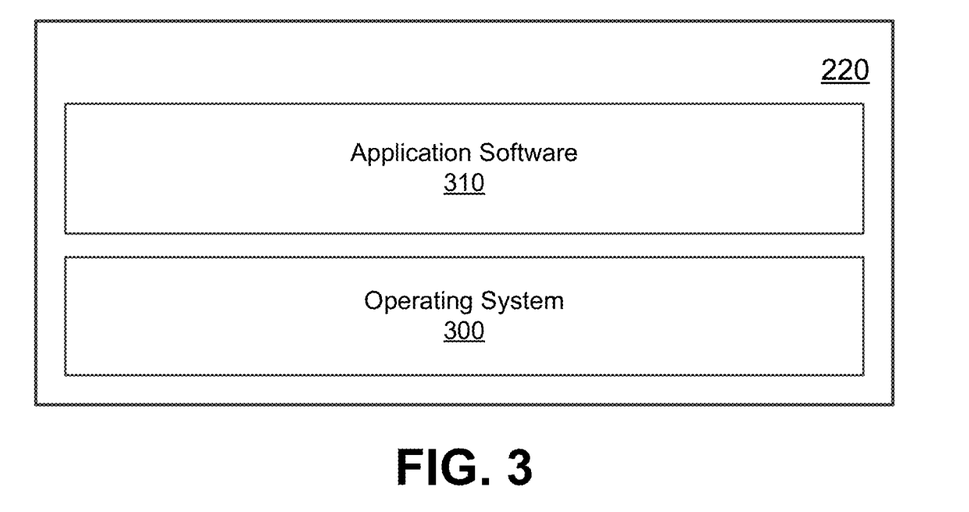
FIG. 3 shows a simplified organization of software components stored in a memory of the example computing device of FIG. 2.

FIG. 3 depicts a simplified organization of software components stored in the memory 220 of the example computing device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computing device 200, in combination with the operating system 300, to operate as a device performing a particular function. For example, the application 310 may cooperate with the operating system 300 to adapt a suitable embodiment of the example computing device 200 to operate as the first remote computing device 100 (FIG. 1), the second remote computing device 150 (FIG. 1), the server 160 (FIG. 1) or the value storage management server 170.

While a single application 310 is illustrated in FIG. 3, in operation the memory 220 may include more than one application 310 and different applications 310 may perform different operations. For example, in at least some embodiments in which the computing device 200 is functioning as one of the remote computing devices 100, 150 (e.g., as the host device or the recipient device), the applications 310 may include a value transfer application which may, for example, be a personal banking application. The value transfer application may be configured for secure communications with the value storage management server 170 and may provide various banking functions such as, for example, the ability to display a quantum of value in one or more accounts (e.g., display balances), configure transfers of value (e.g., bill payments and other transfers), and other account management functions.

By way of further example, in at least some embodiments in which the computing device 200 functions as one of the remote computing devices 100, 150 (e.g., as the host device or the recipient device), the applications 310 may include a web browser, which may also be referred to as an Internet browser. In at least some such embodiments, the server 160 may be a web server that may serve one or more of the interfaces described herein. The web server may cooperate with the web browser and may serve an interface when the interface is requested through the web browser. For example, the web server may serve one or more of the electronic invitation configuration interface, an electronic card configuration interface, or an interface of another type. The web server may, for example, serve an electronic invitation having one or more functions as generally described herein.

By way of further example, in at least some embodiments in which the computing device 200 functions as one of the remote computing devices 100, 150 (e.g., as the host device or the recipient device), the applications 310 may include an electronic messaging application. The electronic messaging application may be configured to display a received electronic message such as an email message, short messaging service (SMS) message, or a message of another type. In at least some embodiments, the server 160 may be configured, through computer-executable instructions, to send a message for accessing an electronic invitation to a defined recipient of the electronic invitation. For example, the server 160 may be configured to send an email message to an address associated with a recipient and an electronic messaging application on a recipient device may be configured to retrieve the message and display the message to its recipient. The message may include the electronic invitation and/or may include a link for accessing the electronic invitation.

Figure 4:
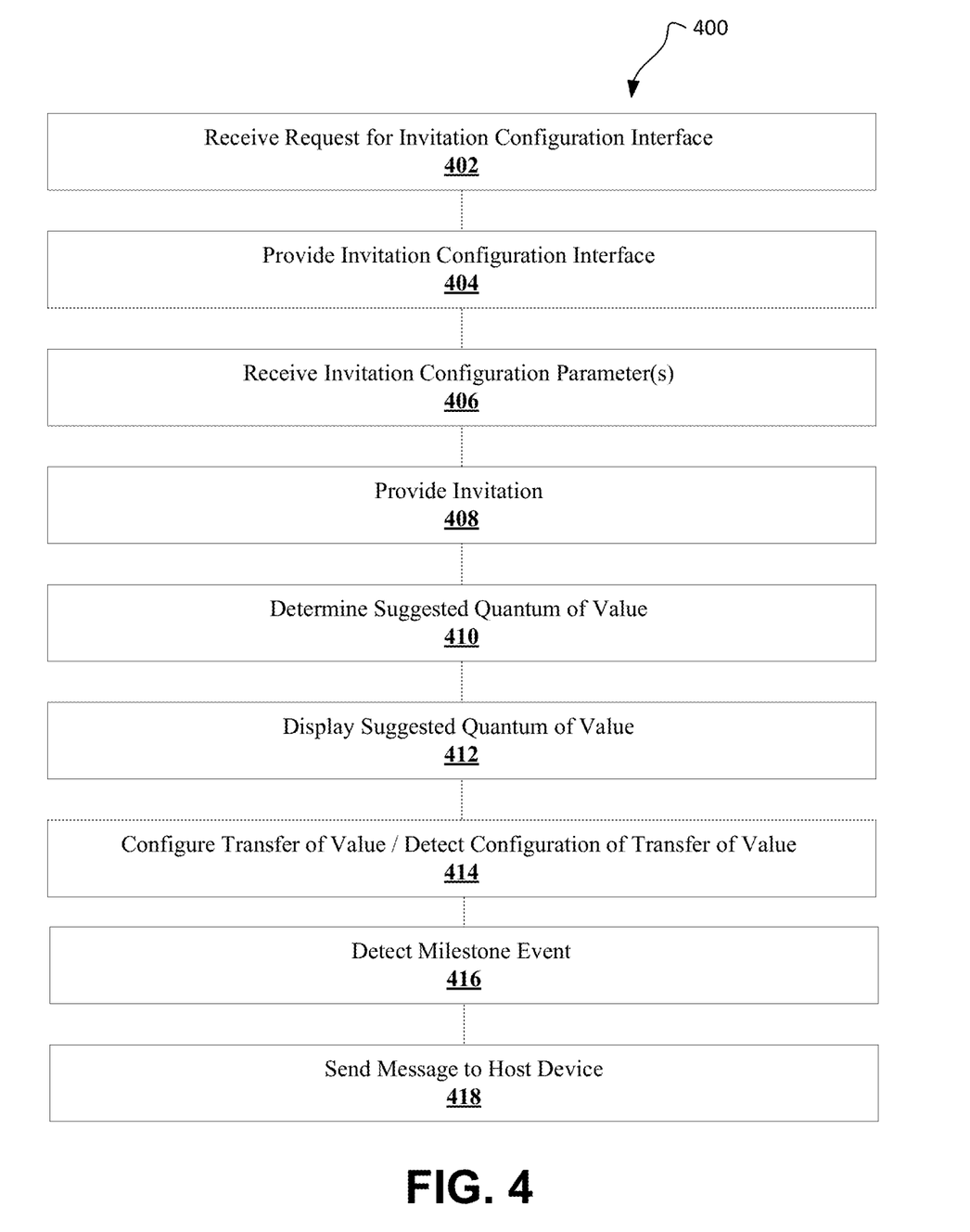
FIG. 4 is a flowchart showing operations performed by a server in accordance with example embodiments of the present disclosure.

Operations performed by the remote computing devices 100, 150 and the server 160 will be described below with reference to FIGS. 4-9. Referring first to FIG. 4, a flowchart showing example operations is illustrated.

FIG. 4 is a flowchart showing operations performed by a server 160. The operations may be included in a method 400 which may be performed by the server 160. For example, computer-executable instructions stored in memory of the server 160 may, when executed by a processor of the server 160, configure the server 160 to perform the method 400 or a portion thereof.

At operation 402, the server 160 receives, via the communications module 230 (FIG. 2) a request for an invitation configuration interface. The request may be received from a first client device (which may be referred to as a host device). In at least some embodiments, the request may be a hypertext transfer protocol (HTTP) request, such as an HTTP GET. The request may be issued by a web browser operating on the host device. The web browser may, for example, receive a command through selection of a link or input of an address (such as a uniform resource locator) associated with the invitation configuration interface and may, in response, send the request for the invitation configuration interface to the server 160. The request may, in other embodiments, be issued by an application other than a web browser. For example, a value transfer application, such as a personal banking application, operating on the host device may issue the request.

At operation 404, the server 160 provides, via the communications module and to a first client device (i.e., the host device), an invitation configuration interface. The invitation configuration interface is a graphical user interface that is provided for display on the first client device. The invitation configuration interface is configured to allow an operator of the first client device to remotely configure an electronic invitation to a milestone event, such as a wedding.

Figure 6:
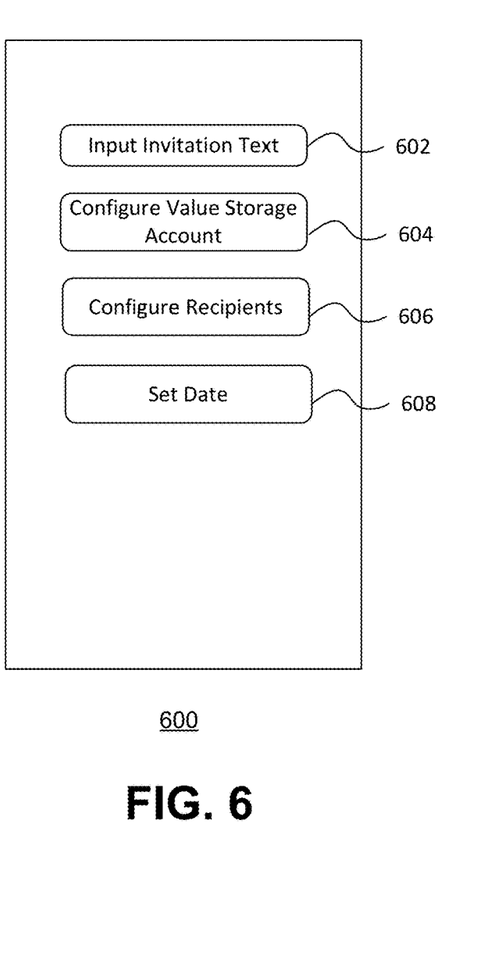
FIG. 6 is an example invitation configuration interface in accordance with example embodiments of the present disclosure.

Referring briefly to FIG. 6, an example invitation configuration interface 600 is illustrated. As illustrated, the example invitation configuration interface 600 includes a plurality of interface elements that may be used to configure an electronic invitation. For example, the example invitation configuration interface 600 includes a selectable option 602 to input text associated with an invitation for a milestone event, a selectable option 608 to specify a date associated with the invitation for the milestone event, a selectable option 604 to configure a value storage account, and a selectable option 606 to define one or more recipients associated with the invitation. The invitation configuration interface 600 may include other interface elements apart from those illustrated in FIG. 6. Other interface elements may allow, for example, selection of one or more graphics, uploading of photographs, inputting a location of an event, etc.

The various interface elements included in the invitation configuration interface 600 may, for example, allow invitation details associated with a milestone event to be configured. For example, a text-based description of the event or an honored guest associated with the event (e.g., the bride(s) and/or groom(s)) may be input through interaction with the invitation configuration interface 600. One or more recipients may also be defined through interaction with the invitation configuration interface 600. For example, a messaging address for each recipient (e.g., an email address) may be configured, together with a name of the recipient and, in at least some embodiments, other invitees (such as significant others, family members or other guests that are to be included on a common instance of the electronic invitation).

Accordingly, for each instance of the invitation that is to be sent, the invitation configuration interface may include a selectable option to configure a number of guests associated with that instance of the invitation. For example, where two guests are included in a single instance of the invitation (which may occur, for example, when a couple is invited), the selectable option to configure the number of guests may be used to associate a single instance of the invitation with the two guests. In such instances a messaging address may be defined for one or both of the invitees but either invitee may reply (i.e., RSVP) or configure a secure transfer of value for or on behalf of the other of the invitees.

The selectable option 604 to configure a value storage account may, when selected, cause the host device to prompt for one or more configuration parameters associated with a value storage account. The configuration parameters may include, for example, any one or more of: an account number associated with a bank account, an institution number associated with a bank, a transit number, a swift code, or an alias for any such numbers.

In at least some embodiments, the selectable option 604 to configure a value storage account may be provided within a value transfer application, such as a banking application provided on the host device. For example, the banking application may include value added features, such as the ability to configure electronic invitations. In at least some such embodiments, the selectable option 604 to configure a value storage account may include an option to select an account, from a list of available accounts. For example, the option may allow for selecting between a checking account and a savings account.

Conveniently, by integrating the electronic invitation features with the banking application, the electronic invitation may be automatically configured with a host name that is based on a name that is associated with an active account. For example, if the electronic invitation is configured while a user is in an authenticated session that was authenticated using credentials for John Smith, the server 160 may automatically include the name "John Smith" in the electronic invitation. Doing so might reduce fraud that could occur, for example, if a fraudster were to send out a fake invitation to try to trick recipients into transferring data into an account associated with the fraudster. Populating the invitation using at least some banking data (such as a customer name) for the account that is to receive the transfer value may prevent at least some such attacks.

While the example invitation configuration interface of FIG. 6 illustrates interface elements that are virtual buttons, other types of interface elements may be used instead of or in addition to the interface elements illustrated. For example, the interface elements may include fields, check boxes, radio boxes, buttons, keys, slider bars, etc.

Referring again to FIG. 4, at operation 406, the server 160 receives, through the invitation configuration interface and via the communications module, one or more invitation configuration parameters. The configuration parameters are based on input received at the host device through the invitation configuration interface. For example, the server 160 may receive one or more signals which may represent at least the date associated with the invitation, a configuration parameter for the value storage account and a messaging address for the recipient. The signals may be received when the associated selectable options are selected and used to input the associated data.

Other data may be received from the host device at the server 160. For example, invitation data, such as a description of the event, the name of one or more honored guests associated with the event, the location of the event, or other invitation data may be received.

In at least some embodiments, the server 160 may validate at least some of the data received at operation 406. For example, authentication may be performed to ensure that the value storage account is associated with a party identified on the invitation. For example, the name of a person on the invitation may be compared with the name associated with the value storage account to ensure that the names correspond to one another. Such authentication may, for example, reduce the possibility of an attack in which a malicious party sends a fraudulent invitation that has been configured with the value storage account for the malicious party but that purports to be for an event honoring another. In some embodiments, the name associated with the value storage account may be specified by a configuration parameter for the value storage account and may be received from the host device. In some embodiments, the server 160 may interact with a value storage management server 170 in order to validate a value storage account. For example, the server 160 may communicate with the value storage management server 170 to confirm that a name associated with the value storage account specified by the configuration parameters received from the host device corresponds to a name that is configured to be displayed on the electronic invitation. For example, the server 160 may send a message to the value storage management server 170 asking for confirmation of a name associated with specified account parameters. If the validation fails, the server 160 may issue an error. This error may be communicated to the host device and the electronic invitation may not be sent.

At operation 408, the server 160 provides an electronic invitation to a recipient device. The server 160 may do so by sending a message to the recipient device via the communications module using a messaging address that was received from the host device through interaction with the invitation configuration interface. The message may, for example, be sent via email. In some embodiments, the electronic invitation may be sent within an email message. In some embodiments, a message may be sent that includes a link to the electronic invitation.

Figure 7:
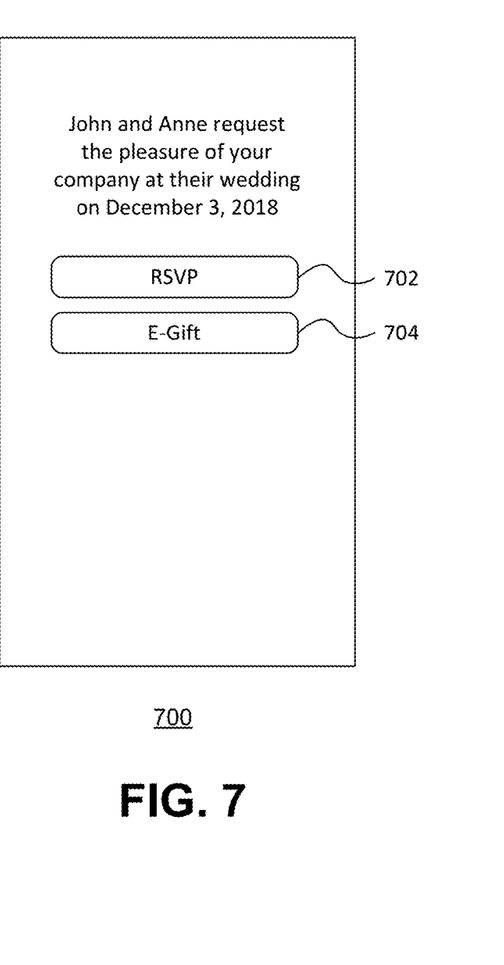
FIG. 7 is an example electronic invitation in accordance with example embodiments of the present disclosure.

An example electronic invitation 700 is illustrated in FIG. 7. The example electronic invitation 700 may be displayed on a recipient device. The example electronic invitation includes a selectable option 702 to send an electronic response to the invitation (e.g., to "RSVP") and a selectable option 704 to transfer value to the value storage account (e.g., to "e-gift").

The selectable option 702 to send an electronic response to the invitation may be selected through interaction with an input module associated with the recipient device to cause a message to be sent to the server 160. The message may include an indication of whether a recipient is attending or not attending an event. The message may include an indication of a number of individuals that are contemplated by the response. For example, the message may indicate the number of parties that are attending the event in response to the invitation.

The selectable option 704 to transfer value to the value storage account may be configured for initiating a transfer using the configuration parameter for the value storage account. For example, the selectable option 704 to transfer value to the value storage account may be selected to configure an electronic transfer of value to an honored guest associated with the event.

Selection of the selectable option 704 to transfer value may cause the recipient device to prompt for transfer parameters including a quantum of value that is to be transferred. The transfer parameters may also include, for example, credit card or debit card parameters, such as a personal account number (PAN), expiry date, credit card verification (CCV) number, authorization data (such as a password, PIN, security question/answer that is to be used by the host/honoured guest to accept the transfer of value).

In some embodiments, the selectable option 704 to transfer value to the value storage account is configured to cause the recipient device to, in response to receiving the selection of the selectable option 704 to transfer value, activate a value transfer application stored on the recipient device. The value transfer application may, for example, be a banking application. If the value transfer application is already operating in an authenticated session, activation of the value transfer application may cause the value transfer application to be brought to the foreground. If the value transfer application is not operating in an authenticated session, the value transfer application may prompt for authentication information.

In at least some embodiments, selection of the selectable option 704 to transfer value may cause the recipient device to provide the configuration parameter for the value storage account and/or other data (such as a suggested quantum of value and/or date) to the value transfer application. For example, the configuration parameter may be passed to the value transfer application as a parameter when the value transfer application is called. By providing such data directly to the value transfer application, the value transfer application may initiate a transfer without requiring input of such information. For example, an account number associated with the honoured guest may not need to be manually input since the account number may be automatically input to the value transfer application.

In at least some embodiments, the selectable option 704 to transfer value to the value storage account may be further configured for automatically configuring a date associated with the transfer with the date associated with the event. For example, the date of the milestone event may be automatically passed to the value transfer application and used as the default date for a transfer of value. Conveniently, the transfer may be automatically configured to occur on the date of the event.

In some instances, the server 160 may provide a suggestion regarding a quantum of value to be transferred. For example, at operation 410, the server may determine a suggested quantum of value to be transferred and, at operation 412, may send the suggested quantum of value to the recipient device for display on the recipient device. That is, at operation 412 (which may occur after selection of the selectable option to transfer value to the value storage account is received), the server 160 may cause the recipient device to display the suggested quantum of value to be transferred. For example, the suggested quantum of value may be passed to a value transfer application as a parameter when the value transfer application is called so that the value transfer application opens at a transfer configuration page which displays the suggested quantum of value as a default quantum associated with the transfer.

The suggested quantum of value may be determined based on various criteria. For example, in at least some embodiments, the suggested quantum of value to be transferred may be determined based on historical data for previously configured transfers of value. That is, a quantum for previously configured transfers (which may be for the same event in some embodiments or for different events in other embodiments) may be used to determine a suggested quantum. The determination may be made by calculating a mean, truncated or trimmed mean, mode, a weighted average or using another operation.

The suggested quantum of value to be transferred may be determined based on a location. For example, a geographic region associated with the milestone event (or a home location of an honoured guest) may be used to filter historical data for previously configured transfers of value so that only data that is associated with a location that is sufficiently close to the milestone event (or the home location of an honoured guest) is used to determine the suggested quantum of value. The sufficiency of proximity may be assessed based on a predetermined threshold in some embodiments. In other embodiments, locations will be considered to be sufficiently close if they are within a common defined geographic region (e.g., same city, province, state, country, etc.). Other techniques of filtering based on proximity may also be used. By using the location, the suggestion may be made to automatically account for regional norms.

As noted previously, the historical data that is used to determine a suggested quantum of value may be data for the same event. For example, the suggested quantum of value may be determined based on historical data for other recipients of invitations to the same milestone event. In some embodiments, the suggested quantum of value may be determined based on historical data for other recipients of invitations to other events. The other events may, in at least some embodiments, be events that are of the same type as the milestone event. That is, the server 160 may determine a type associated with the milestone event and may filter historical data based on the type. The type may be received at the server 160 from the host device (e.g., it may be a configuration parameter received at operation 406). That is, the server 160 may receive, via the communication module, an indication of an event type associated with the milestone event and the suggested quantum of value to be transferred may be determined based on historical data for events having an event type corresponding to the event type specified in the received indication.

In some embodiments, the type may be automatically determined through algorithmic analysis of the configuration parameters. For example, the text of the invitation may be analyzed to determine whether the text includes and/or excludes a keyword or key phrase associated with a certain type of event. For example, the word "marriage", in the absence of the word "anniversary" may suggest that the event is a wedding.

The suggested quantum of value may also be determined based on the number of guests that were invited on an instance of the electronic invitation. For example, when two guests are included, the suggested quantum of value may be greater than when a single guest is included. For example, the invitation configuration interface may also include a selectable option to configure a number of guests associated with the invitation and the server may receive, through the invitation configuration interface and via the communications module, an indication of the number of guests associated with the invitation and may determine the suggested quantum of value to be transferred based on the indication of the number of guests associated with the invitation.

The suggested quantum of value may also be determined based on a reply to the invitation. For example, the selectable option 702 (FIG. 7) to send an electronic response to the invitation may be selected at the recipient device to send a response to the invitation and the response may include an indication of the number of guests that will be attending the event. The server 160 may then determine the quantum of value to be transferred based on the indication of the number of guests that will be attending the event.

The suggested quantum of value may, in at least some embodiments, be determined based on a relationship type. The relationship type may represent the nature of the relationship between the recipient and the honored guest (e.g., whether they are family, friends, co-workers, acquaintances, siblings, children, parents, etc.). The relationship type may be specified by either the host device or the recipient device. That is, in some embodiments, the relationship type may be obtained at the server 160 from the host device (e.g., during configuration of the electronic invitation) and in some embodiments, the relationship type may be obtained at the server 160 from the recipient device.

The suggested quantum of value may be expressed in a variety of ways including any one or more of: a number, a range, a plurality of numbers, a plurality of numbers associated with statistics (e.g., 10% gave $200), etc.

Figure 8:
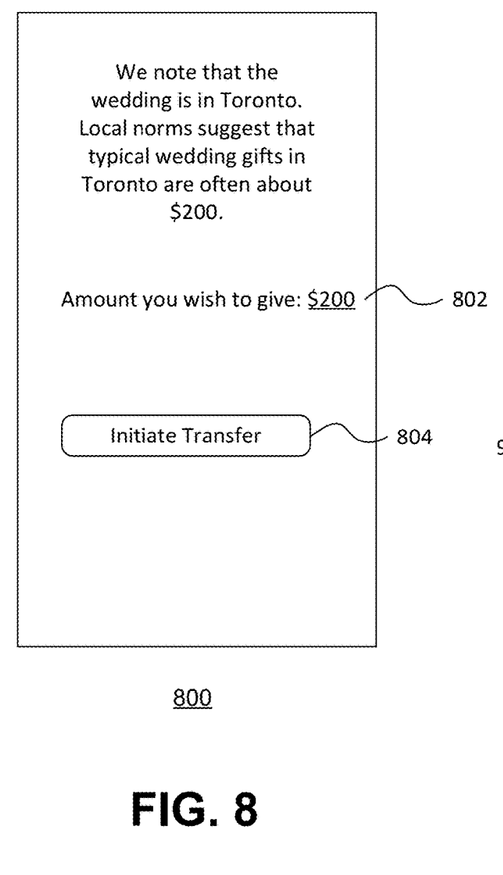
FIG. 8 is an example transfer initiation interface in accordance with example embodiments of the present disclosure.

The server 160 causes the suggested quantum of value to be displayed on the recipient device at operation 412. The suggested quantum of value may be displayed, for example, after activation of the selectable option 704 to transfer value to the value storage account. For example, in response to activation of the selectable option 704 to transfer value to the value storage account a transfer initiation interface may be displayed on the recipient device. An example transfer initiation interface 800 is illustrated in FIG. 8. The example transfer initiation interface 800 specifies the suggested quantum of value and, in the example, includes a value configuration field 802 for receiving a selected quantum of value. The value configuration field 802 may default to the suggested quantum of value but may be modified through an input module of the recipient device. The example transfer initiation interface 800 also includes a selectable option 804 to initiate the transfer. In at least some embodiments, the example transfer initiation interface 800 may be displayed within a value transfer application.

Referring again to FIG. 4, in at least some embodiments, the server 160 may configure a transfer of value or may detect a configuration of the transfer of value. Whether the server 160 configures the transfer or whether the server 160 detects such configuration may depend on whether the server 160 participates in the transfer process. For example, as noted previously, in some embodiments, the server 160 and the value storage management server 170 may be implemented by a common server and so the server 160 may participate in configuration of the transfer. The server 160 may also participate in the configuration of the transfer in embodiments in which the server receives transfer parameters such as a personal account number (PAN), expiry date, credit card verification (CCV) number, etc. For example, the server may, after receiving such transfer parameters and an indication of a desired quantum of value, configure a transfer of value using such parameters.

In some embodiments, the transfer of value may be configured to occur on the date of the milestone event. In some embodiments, the server 160 may not take any role in the configuration of the transfer of value and may only be notified on the transfer by the value storage management server 170 or the recipient device. That is, the server 160 may, at operation 414, receive a signal representing a message. The message may indicate that a transfer of value has been configured and may include one or more parameters to be associated with the transfer of value. For example, in some embodiments, a date when the transfer of value is scheduled to occur may be received at the server 160.

At operation 416, the server 160 may detect the milestone event. For example, after a transfer of value has been configured through selection of the selectable option to transfer value to the value storage account, the server 160 may determine that a current date matches the date of the milestone event. The current date may be the date reflected by a system clock, for example. The date of the milestone event may be the date specified in a configuration parameter received at operation 406.

In at least some embodiments, at operation 418, in response to determining that the current date matches the date of the milestone event, the server 160 may automatically send a message to a messaging address previously configured for a party associated with the milestone event (such as the honoured guest). The message may notify the party of the transfer of value. The messaging address may have been communicated to the server 160 as part of the configuration parameters at operation 406 and stored at the server 160 at that time or the messaging address may have been a messaging address associated with an account that was active at the time the configuration parameters were received. For example, in at least some embodiments, before, during or after the request is received at operation 402, the host device may login to an associated value storage management server 170 (FIG. 1) and/or to the server 160. For example, the host device may send authentication information (such as a username, password, PIN, biometric data, etc.) to one or both of the value storage management server 170 and/or the server 160 and the value storage management server 170 and/or the server 160 may authenticate such authentication information to begin an authenticated session. During the authenticated session, the value storage management server 170 and/or the server 160 may associate messages with a specific account. For example, the request that is received at operation 402 and/or the invitation configuration parameters that are received at operation 406 (which will be discussed below) may be associated with a specific account. Then, notifications, such as the message provided at operation 418, may be provided to a messaging address associated with that account.

Figure 5:
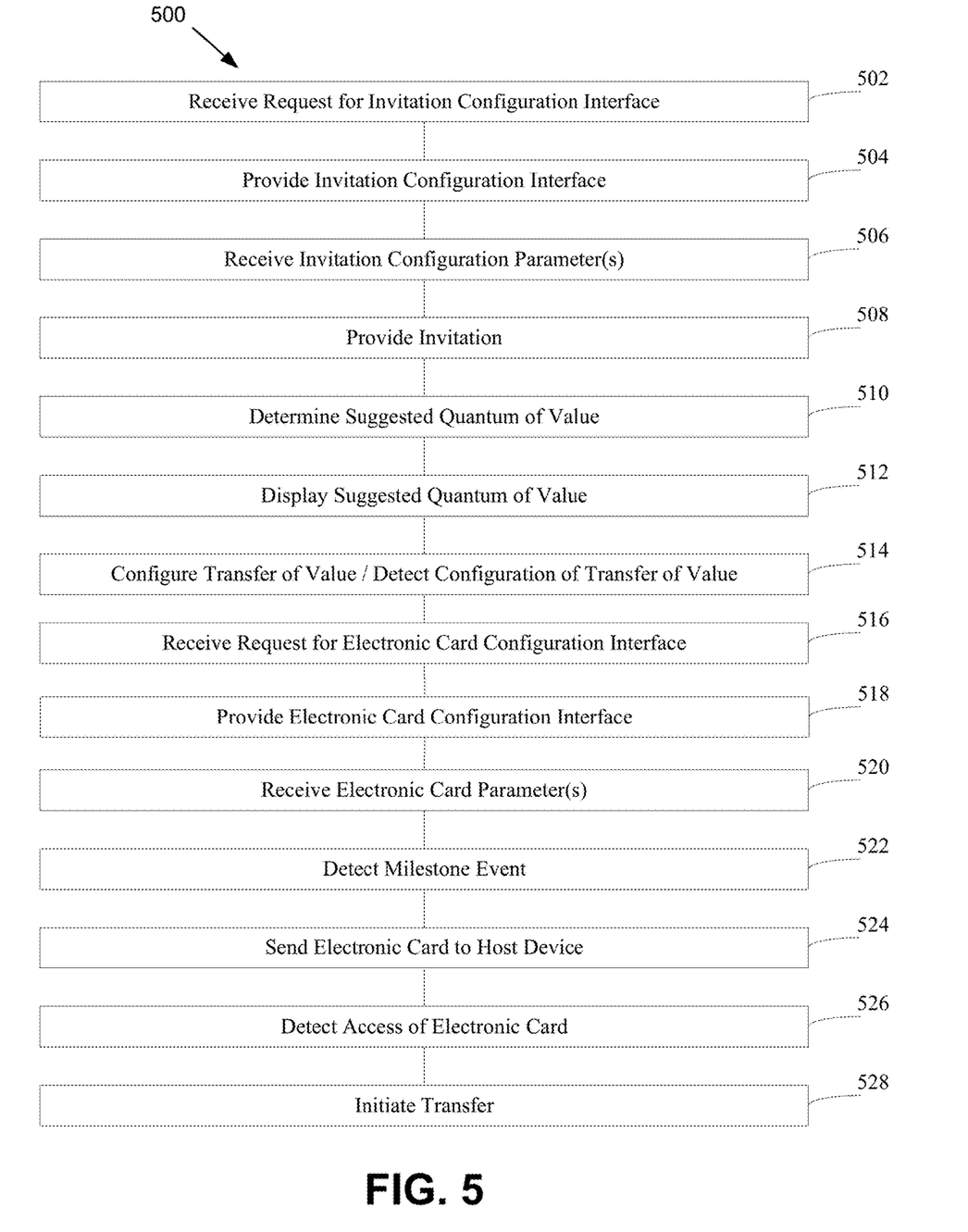
FIG. 5 is a flowchart showing operations performed by a server in accordance with example embodiments of the present disclosure.

Referring now to FIG. 5, a flowchart showing example operations is illustrated. FIG. 5 illustrates operations performed by a server 160. The operations may be included in a method 500 which may be performed by the server 160. For example, computer-executable instructions stored in memory of the server 160 may, when executed by a processor of the server 160, configure the server 160 to perform the method 500 or a portion thereof.

Operations 502 to 514 are common with operations 402 to 414 of the method 400 of FIG. 4 and the description of these operations will not be repeated.

As part of the electronic invitation, the server 160 may provide an electronic card configuration interface which allows the recipient device to configure an electronic card that is to be associated with the transfer of value. The electronic invitation may, for example, include a selectable option to initiate configuration of an electronic card. Once this selectable option is selected through an input module of the recipient device, the recipient device may send a signal to the server 160. The signal may represent a request for an electronic card configuration interface. This request may be received at the server 160 at operation 516. The request may be received when a selectable option 704 (FIG. 7) to transfer value was selected.

In response to receipt of the request for the electronic card configuration interface, the server 160 may, at operation 518, provide an electronic card configuration interface to the recipient device. For example, the server 160 may, after determining that the selectable option to transfer value to the value storage account has been selected, send an electronic card configuration interface to the recipient device. The electronic card configuration interface may allow for configuration of an electronic card to be sent to a party associated with the milestone event. For example, the electronic card may be a card that is intended to be sent to the host of the event or honored guest for the event.

The electronic card configuration interface may include various features for configuring an electronic card. For example, the electronic card configuration interface may include one or more of: a selectable option to select a visual element (e.g., a graphic or photograph) to be provided by the server to the recipient device, a selectable option to specify text to be included in the card, and/or a selectable option to include a signature to be associated with the card.

The recipient device may receive electronic card configuration parameters (such as the visual element, text, signature, etc.) through an input module associated with the recipient device. The recipient device may send the electronic card configuration parameters to the server 160 where they may be received at operation 520.

At operation 522, the server 160 may detect the milestone event. The detection of the milestone event may operate as described above with respect to operation 416 of the method 400 of FIG. 4.

At operation 524, the server 160 may send, via the communications module and to a messaging address previously configured for the party associated with the milestone event, a message configured for accessing the electronic card. The message may be sent at operation 524 in response to detecting the milestone event. For example, in response to determining that the current date matches the date of the milestone event, the server may automatically send a message to a messaging address previously configured for a party associated with the milestone event (such as the host or honoured guest). The messaging address may have been communicated to the server 160 as part of the configuration parameters at operation 406 and stored at the server 160 at that time or the messaging address may have been a messaging address associated with an account that was active at the time the configuration parameters were received. The message is configured for accessing the electronic card. In some embodiments, the message may include the electronic card (including, for example, visual elements, text and/or a signature configured for the electronic card) and, in some embodiments, the message may include instructions (such as a link) for accessing the electronic card.

In some embodiments, the transfer of value may have been configured to occur on the milestone date and so the honoured guest may receive both an electronic card and a transfer of value on the date of the event. As illustrated in FIG. 5, in some embodiments, the transfer of value may, instead, be configured to be initiated in response to detecting access of the electronic card. For example, after the electronic card has been accessed (e.g., through a device such as the host device), the server 160 may initiate the transfer of value. For example, at operation 526 the server may detect that the electronic card has been accessed and at operation 528 may, in response to detecting that the electronic card has been accessed, initiate the transfer of value.

Figure 9:
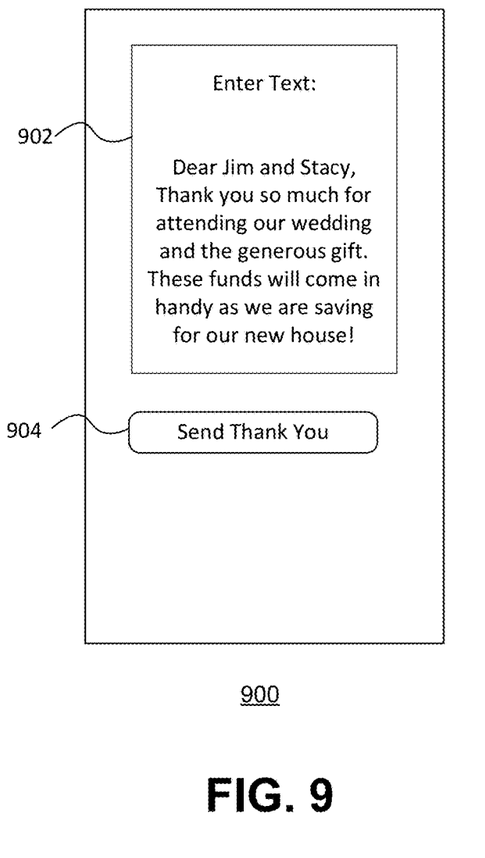
FIG. 9 is an example courtesy card configuration interface in accordance with example embodiments of the present disclosure.

After the electronic card has been delivered and/or after a transfer of value has occurred and/or after the date of the milestone event, the server 160 may provide, to the host device, a courtesy card configuration interface. The courtesy card configuration interface may include interface elements similar to those described above for the electronic card configuration interface; for example, options for inputting text, visual elements, a signature, etc. However, the courtesy card configuration interface is configured for inputting a thank you card. The server 160 may be configured to automatically customize the courtesy card based on a transfer of value. For example, when a transfer of value is made by a recipient of an electronic invitation through activation of a selectable option associated with the invitation to transfer value, then the electronic thank you card may be automatically populated with text that is based on the transfer of value. For example, when a transfer of value is configured, the text may be customized to account for the transfer of value and the text may differ when a transfer of value is configured as compared with when a transfer of value has not been configured. By way of example, the default text for the courtesy card when the transfer of value has not been configured may be "Thank you for coming to our wedding. It was so wonderful to have you there" whereas the default text for a courtesy card when the transfer of value has been configured may be "Thank you so much for attending our wedding and the generous gift. These funds will come in handy as we are saving for our new house!" Accordingly, different default text and/or a different default template may be selected when a transfer of value has been configured than when a transfer of value has not been configured. In some embodiments, the server 160 may also consider the quantum of the transfer of value when selecting a default text/template. For example, the server 160 may compare the quantum to a defined threshold and may select one version of the text/template if the quantum is less than the threshold and another version if the quantum exceeds the threshold.

An example courtesy card configuration interface 900 is illustrated in FIG. 9. As illustrated, the courtesy card configuration interface 900 includes a selectable option 902 to configure the content of the courtesy card (e.g., the text) and a selectable option 904 to send the electronic card. Selection of the selectable option 904 to send the electronic card causes the device displaying the courtesy card configuration interface 900 (e.g., the host device) to send the electronic courtesy card. The electronic courtesy card may be sent to the messaging address associated with the recipient and it may be sent via the server 160 (i.e., the server may receive courtesy card configuration parameters and may then send a message to the messaging address to allow the recipient device to access the electronic courtesy card).

The methods described above may be modified and/or operations of such methods combined to provide other methods.

In some embodiments, authorization data (such as a password, PIN, security question/answer that is to be used by the host/honoured guest to accept the transfer of value) may have been defined by the recipient device when the transfer of value is configured. In at least some such embodiments, when the transfer is to occur, the recipient of the transfer (who may be the honoured guest) may be required to input the authorization data. The value transfer management server 170 may only transfer the value from a database record associated with the recipient to another database record associated with the honoured guest after input of correct authorization data by the honoured guest.

In at least some embodiments, the server 160 may be configured to provide value transfer tracking features. The value transfer tracking features may store an association between recipients of electronic invitations and a quantum of value transferred by respective recipients. For example, when a particular recipient has configured or effected a transfer of value, the quantum of that transfer may be stored in memory associated with the server 160 in association with a record for the recipient. The recipient may, therefore, be mapped to the quantum of value. The honoured guest may, through communications with the server using a computing device, retrieve the mapping. Conveniently, the server 160 may automatically track such transfers of value.

The server 160 may provide other analysis tools including, for example, an interface for displaying a total quantum of value transferred (or configured to be transferred) to an honoured guest. The total may be determined based on all transfers of value to the honoured guest from all recipients of electronic invitations.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled to the communications module; and
a memory coupled to the processor, the memory storing instructions which, when executed, configure the processor to:
provide, via the communications module and to a first client device, an invitation configuration interface for display on the first client device, the invitation configuration interface including a selectable option to specify a date associated with an invitation for a milestone event, a selectable option to configure a value storage account, and a selectable option to define a recipient associated with the invitation;

receive, through the invitation configuration interface and via the communications module, one or more signals representing at least the date associated with the invitation, a configuration parameter identifying the value storage account, and a messaging address for the recipient;

communicate with a value storage management server in order to validate the value storage account by confirming that a name associated with the value storage account specified by the received configuration parameter corresponds to a name that is configured to be displayed on the electronic invitation such that the name that is configured to be displayed on the electronic invitation is based on a name associated with an active account of an authenticated session of a banking application; and upon successful validation of the value storage account, provide an electronic invitation to the recipient by sending a message to a recipient device via the communications module using the messaging address, the electronic invitation including a selectable option to send an electronic response to the invitation and a selectable option to transfer value to the value storage account, the selectable option to transfer value to the value storage account configured to cause the recipient device to:
in response to receiving a selection of the selectable option to transfer value, activate a value transfer application stored on the recipient device,
provide the configuration parameter for the value storage account to the value transfer application, and
initiate a transfer to the value storage account identified by the configuration parameter without requiring input from the recipient to identify the value storage account.

2. The server of claim 1, wherein the selectable option to transfer value to the value storage account is further configured for automatically configuring a date associated with the transfer with the date associated with the milestone event.

3. The server of claim 1, wherein the instructions further configure the processor to:
after a transfer of value has been configured through selection of the selectable option to transfer value to the value storage account, determine that a current date matches the date of the milestone event; and
in response to determining that the current date matches the date of the milestone event, automatically send a message to a messaging address previously configured for a party associated with the milestone event, the message notifying the party of the transfer of value.

4. The server of claim 3, wherein the selectable option to transfer value to the value storage account, when selected, causes a selectable option to select a visual element to be provided by the server, and wherein the instructions further configure the processor to receive a signal representing a selection of a visual element, and wherein the message includes a selected visual element.

5. The server of claim 1, wherein the instructions further configure the processor to: after determining that the selectable option to transfer value to the value storage account has been selected, send an electronic card configuration interface to the recipient device, the electronic card configuration interface allowing for configuration of an electronic card to be sent to a party associated with the milestone event.

6. The server of claim 5, wherein the instructions further configure the processor to:
send via the communications module and to a messaging address previously configured for the party associated with the milestone event, a message configured for accessing the electronic card;
detect that the electronic card has been accessed; and
in response to detecting that the electronic card has been accessed, initiate a transfer of value.

7. The server of claim 5, wherein the instructions further configure the processor to:
determine that a current date matches the date of the milestone event; and
in response to determining that the current date matches the date of the milestone event, automatically send a message to a messaging address previously configured for the party associated with the milestone event, the message configured for accessing the electronic card.

8. The server of claim 1, wherein the instructions further configure the processor to:
determine a suggested quantum of value to be transferred based on historical data for previously configured transfers of value; and
after selection of the selectable option to transfer value to the value storage account, causing the recipient device to display the suggested quantum of value to be transferred.

9. The server of claim 8, wherein the suggested quantum of value to be transferred is determined based on a geographic region associated with the milestone event.

10. The server of claim 8, wherein the suggested quantum of value to be transferred is determined based on historical data for other recipients of invitations to the milestone event.

11. The server of claim 8, wherein the suggested quantum of value to be transferred is determined based on historical data for other recipients of invitations to other events of a same type as the milestone event.

12. The server of claim 8, wherein the instructions further configure the processor to:
receive, the communication module, an indication of an event type associated with the milestone event,
and wherein the suggested quantum of value to be transferred is determined based on historical data for events having an event type corresponding to the event type specified in the received indication.

13. The server of claim 8, wherein the invitation configuration interface includes a selectable option to configure a number of guests associated with the invitation and wherein the instructions further cause the processor to:
receive, through the invitation configuration interface and via the communications module, an indication of the number of guests associated with the invitation,
and wherein the suggested quantum of value to be transferred is determined based on the indication of the number of guests associated with the invitation.

14. The server of claim 1, wherein the instructions further configure the processor to:
receive input authorization data from the first client device to accept the transfer of value,
wherein the selectable option to transfer value to the value storage account is further configured to cause the recipient device to:
define the input authorization data.

15. A computer-implemented method comprising:

providing, to a first client device, an invitation configuration interface for display on the first client device, the invitation configuration interface including a selectable option to specify a date associated with an invitation for a milestone event, a selectable option to configure a value storage account, and a selectable option to define a recipient associated with the invitation;

receiving, through the invitation configuration interface, at least the date associated with the invitation, a configuration parameter identifying the value storage account, and a messaging address for the recipient;

communicating with a value storage management server in order to validate the value storage account by confirming that a name associated with the value storage account specified by the received configuration parameter corresponds to a name that is configured to be displayed on the electronic invitation such that the name that is configured to be displayed on the electronic invitation is based on a name associated with an active account of an authenticated session of a banking application; and upon successful validation of the value storage account, providing an electronic invitation to the recipient by sending a message to a recipient device using the messaging address, the electronic invitation including a selectable option to send an electronic response to the invitation and a selectable option to transfer value to the value storage account, the selectable option to transfer value to the value storage account configured for causing the recipient device to:

in response to receiving the selection of the selectable option to transfer value, activate a value transfer application stored on the recipient device, provide the configuration parameter for the value storage account to the value transfer application, and initiate a transfer to the value storage account identified by the configuration parameter without requiring input from the recipient to identify the value storage account.

16. The computer-implemented method of claim 15, wherein the selectable option to transfer value to the value storage account is further configured for automatically configuring a date associated with the transfer with the date associated with the event.

17. The computer-implemented method of claim 15, further comprising:

after a transfer of value has been configured through selection of the selectable option to transfer value to the value storage account, determining that a current date matches the date of the milestone event; and in response to determining that the current date matches the date of the milestone event, automatically sending a message to a messaging address previously configured for a party associated with the milestone event, the message notifying the party of the transfer of value.

18. The computer-implemented method of claim 17, wherein the selectable option to transfer value to the value storage account, when selected, causes a selectable option to select a visual element to be provided, and wherein the method further comprises:

receiving a representing a selection of a visual element, and wherein the message includes the selected visual element.

\* \* \* \* \*